United States Patent [19]
Norris

[11] Patent Number: 5,942,110
[45] Date of Patent: Aug. 24, 1999

[54] WATER TREATMENT APPARATUS

[76] Inventor: Samuel C Norris, 68 N. Pine St., Lewistown, Pa. 17044

[21] Appl. No.: 08/999,341

[22] Filed: Dec. 29, 1997

[51] Int. Cl.[6] ........................................................ C02F 1/32
[52] U.S. Cl. .................. 210/198.1; 210/748; 210/198.1; 250/431; 250/436
[58] Field of Search ................................ 210/198.1, 748, 210/764; 422/186.3; 15/104.04; 250/431, 436, 432 R

[56] References Cited

U.S. PATENT DOCUMENTS

| | | | |
|---|---|---|---|
| 1,211,052 | 1/1917 | Bernard | 210/249 |
| 3,462,597 | 8/1969 | Young | 250/436 |
| 4,963,750 | 10/1990 | Wilson | 250/436 |
| 5,128,043 | 7/1992 | Wildermuth | 210/243 |
| 5,151,252 | 9/1992 | Mass | 422/186.3 |
| 5,316,673 | 5/1994 | Kohlman et al. | 210/748 |
| 5,597,482 | 1/1997 | Melyon | 210/232 |
| 5,614,151 | 3/1997 | LeVay et al. | 422/24 |
| 5,622,622 | 4/1997 | Johnson | 210/192 |
| 5,624,573 | 4/1997 | Wiesmann | 210/192 |
| 5,725,757 | 3/1998 | Binot | 210/198.1 |
| 5,779,912 | 7/1998 | Gonzalez-Martin et al. | 210/748 |

FOREIGN PATENT DOCUMENTS 41 38 916  11/1991  Germany ............................. 210/748

*Primary Examiner*—Jay H. Woo
*Assistant Examiner*—Frank M. Lawrence
*Attorney, Agent, or Firm*—Michael I. Kroll

[57] ABSTRACT

A water treatment apparatus (10) comprising an elongate metallic brace (12) mounted to a wall (14). Components (16) are for connecting the elongate metallic brace (12) to an inlet water pipe (18) and an outlet water pipe (20), so as to electrically ground the inlet water pipe (18) to the outlet water pipe (20). The elongated metallic brace (12) will also reinforce and stabilize the apparatus (10) in an in line installation to the inlet water pipe (18) and the outlet water pipe (20). A housing assembly (22) has a lamp entrance (24), a water inlet port (26) and a water outlet port (28). The housing assembly (22) is prefabricated, so that it can be completely dismantled for cleaning and easily reassembled for use. A facility (30) is for fluidly attaching and detaching the inlet water pipe (18) to the water inlet port (26) and the outlet water pipe (20) to the water outlet port (28) of the housing assembly (22) for a quick in line installation. An elongate transparent quartz tube (32) connected to the lamp entrance (24) and centrally disposed in a leakproof manner within the housing assembly (22), is capable of passing ultraviolet rays therethrough. An elongate ultraviolet lamp (34) is inserted through the lamp entrance (24) of the housing assembly (22) and into the elongate transparent quartz tube (32), so that water passing through the housing assembly (22) will have bacteria removed therefrom.

4 Claims, 4 Drawing Sheets

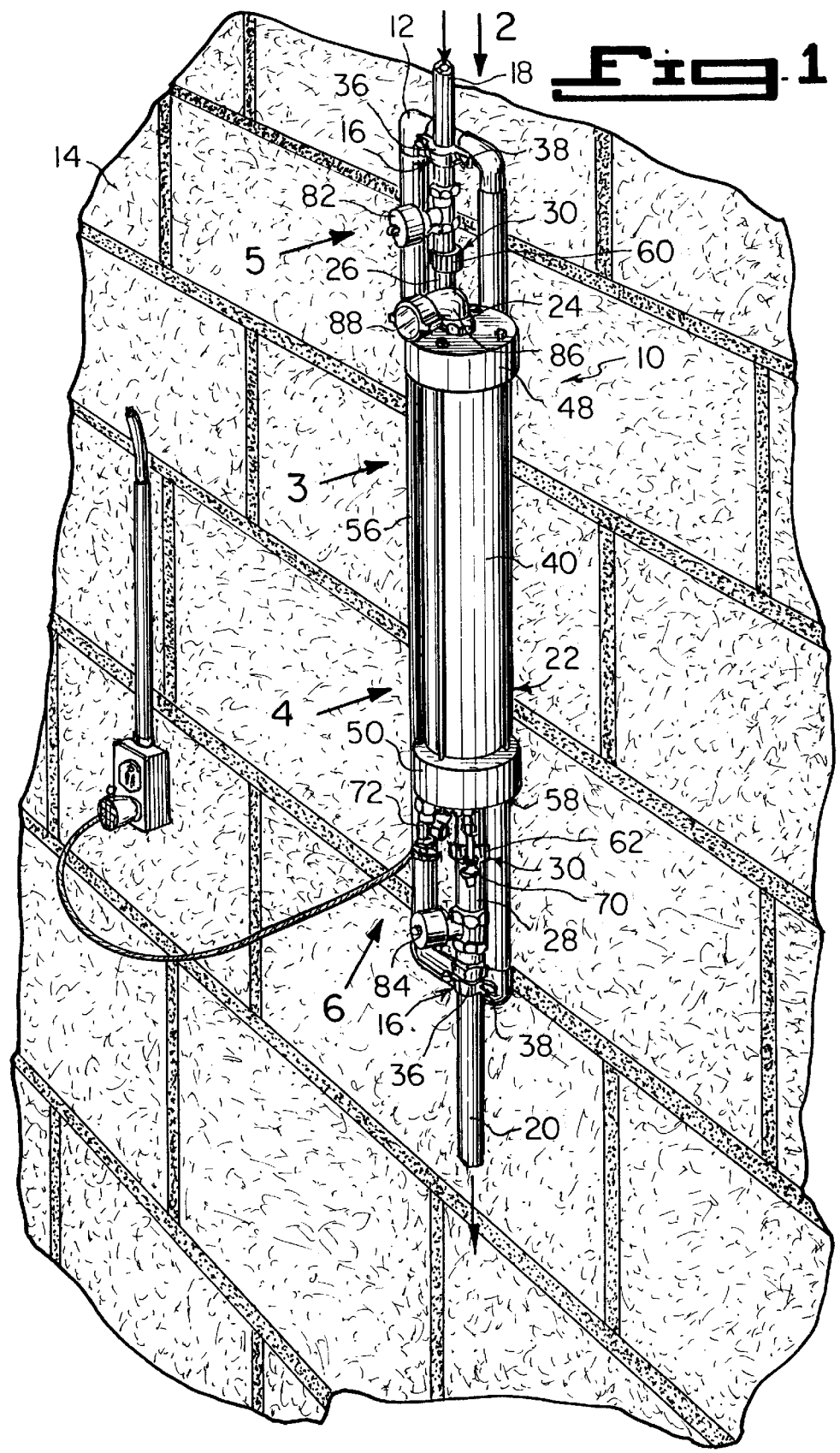

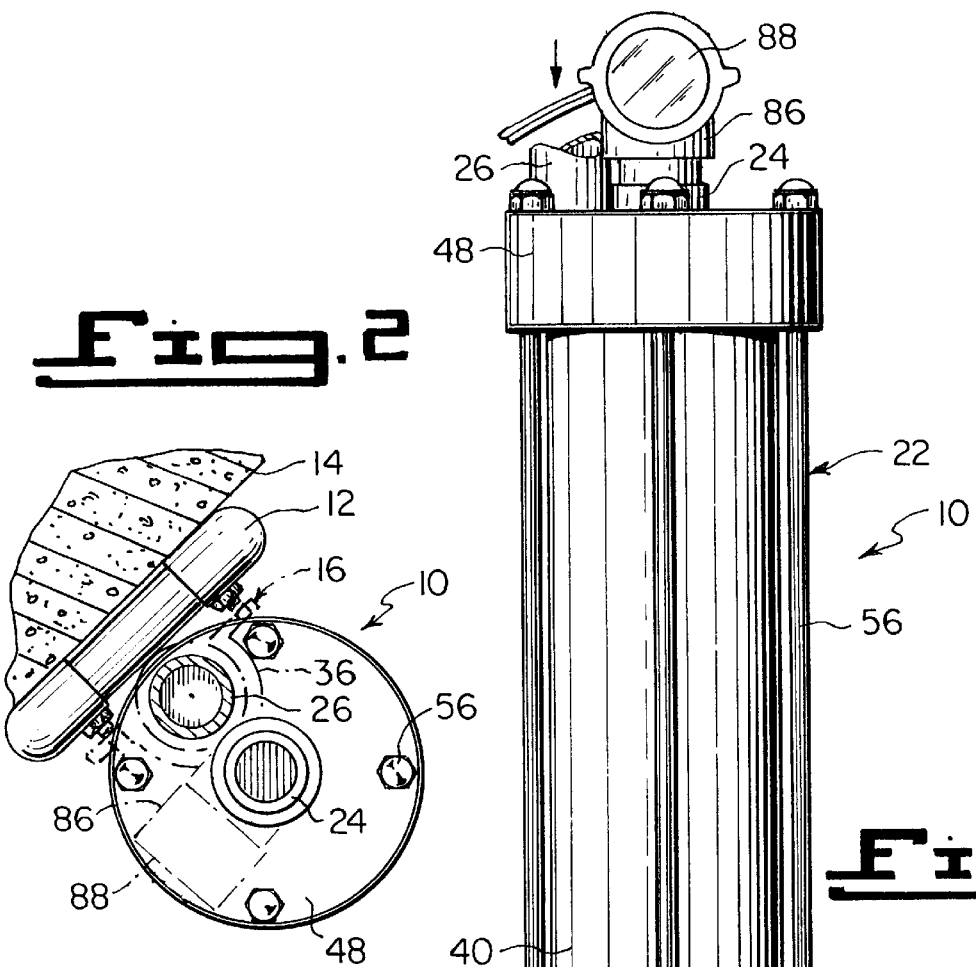
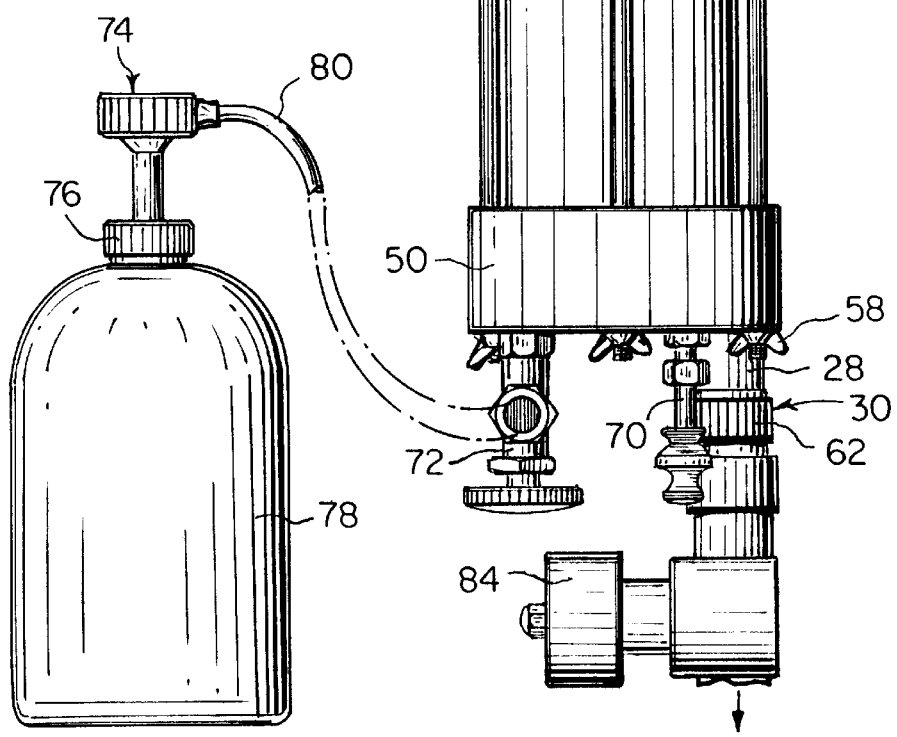

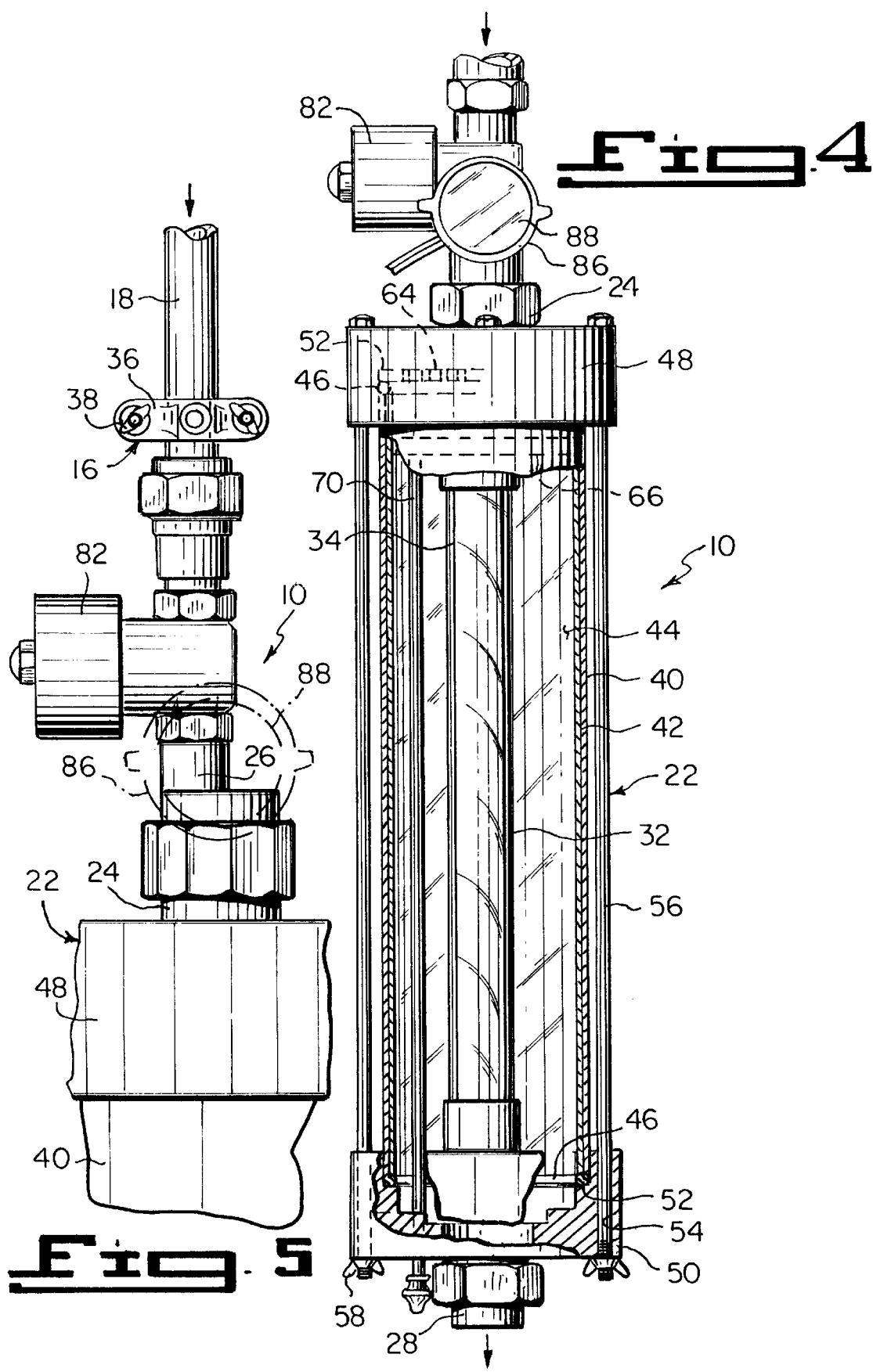

WATER TREATMENT APPARATUS

BACKGROUND OF THE INVENTION

1. Field of the Invention

The instant invention relates generally to ultraviolet sterilizers and more specifically it relates to a water treatment apparatus. The water treatment apparatus contains upper and lower compression fittings for a quick in line installation, and a brace to electrically ground the inlet and outlet water pipes, while also reinforcing the apparatus.

2. Description of the Prior Art

Numerous ultraviolet sterilizers have been provided in prior art. For example, U.S. Pat. Nos. 5,151,252 to Mass; 5,597,482 to Melyon; 5,614,151 to LeVay et al.; 5,622,622 to Johnson and 5,624,573 to Wiesmann all are illustrative of such prior art. While these units may be suitable for the particular purpose to which they address, they would not be as suitable for the purposes of the present invention as heretofore described.

MASS, BARTON

CHAMBER DESIGN AND LAMP CONFIGURATION FOR AN ULTRAVIOLET PHOTOCHEMICAL REACTOR

U.S. Pat. No. 5,151,252

A reactor for the treatment of a fluid with a substantially uniform dosage of light from a line-type light source, which comprises a reactor housing forming an internal space comprising a fluid entry region and a fluid exit region. A central photochemical treatment region comprises a housing, a means for circumferentially distributing fluid flow radially towards and perpendicular to a line-type light source, and a fluid exit region. The central photochemical treatment of the housing is rotationally symmetrical about a central axis. One or more line-type light sources are mounted in the treatment region substantially at the central axis of the housing. The axis of the lamps are oriented parallel to the rotational axis of the treatment region housing. Methods are also provided using the circumferential distribution of fluid flow radially toward and perpendicular to the line-type light source.

MELYON, SOLLY

WATER PURIFICATION APPARATUS

U.S. Pat. No. 5,597,482

Water purification apparatus provides an elongate ultraviolet lamp extending into a surrounding hollow tube capable of passing ultraviolet light. The lamp and tube are surrounded by a housing, with a water inlet and outlet, which provides an annular flow path around the hollow tube through which water may pass for exposure to ultraviolet light. An ultraviolet reflective surface in the annular flow path reflects ultraviolet rays through the water. A unique seal is provided around an open end of the hollow tube to seal the lamp from water in the housing.

LEVAY, THURSTON C.

RUMMEL, JAMES A.

ELECTRODELESS STERILIZER USING ULTRAVIOLET AND/OR OZONE

U.S. Pat. No. 5,614,151

A sanitizer uses a radiant energy source such as a microwave source to excite a gas contained in a bulb, so that the gas produces ultraviolet radiation that can be used to sanitize substances exposed to the radiation. The ultraviolet radiation may also be used to generate ozone from oxygen in air of another gas containing oxygen and the ozone may be used by itself or in combination with ultraviolet exposure to sanitize substances. The bulb for generating ultraviolet radiation can be shaped so that substances to be sterilized are able to pass through the bulb, so that objects (even metal objects) are enclosed by the bulb and shielded from the radiant energy source, or so that the bulb is located at the end of a waveguide and can be positioned to sanitize inaccessible surfaces or substances.

JOHNSON, DENNIS E. J.

ULTRAVIOLET STERILIZER AND SOURCE OF IONIZED MOLECULES FOR ELECTROALESCENT/MAGNETIC SEPARATION (ECMS) REMOVAL OF CONTAMINANTS FROM WATER STREAMS

U.S. Pat. No. 5,622,622

An improved sterilizer for destroying biological contaminants in water comprises an annular water jacket through which the water stream flows, disposed around a high-intensity ultraviolet source comprising a number of lamps and a source of an intense magnetic field. Additionally, an air stream flows past the lamps, cooling the lamps, while being exposed to the ultraviolet radiation and the magnetic field, so that oxygen and nitrogen molecules in the atmospheric air stream are ionized. This ionized air stream is further mixed with the water stream to continually reduce and oxidize contaminants therein, and to promote coagulation of contaminants for physical filtration and removal.

WIESMANN, RUDOLF

APPARATUS FOR THE DISINFECTION OF A FLOWING LIQUID MEDIUM AND A PLANT FOR THE TREATMENT OF CLARIFIED SEWAGE

U.S. Pat. No. 5,624,573

An apparatus is disclosed for the disinfection of a liquid medium having a transmission of <75%/cm with the help of UV radiation. The apparatus comprises a plurality of UV radiators combined to a modular UV irradiation battery around which flows the liquid medium to be disinfected. Each UV radiator is oriented in parallel relationship to the flow direction of the liquid medium to be disinfected. The UV radiators are arranged in a matrix like array, particularly in a plurality of rows, each second row of said plurality of rows of UV radiators being offset with reference to the two adjacent rows by an amount corresponding essentially to half the center distance between two adjacent UV radiators located in the same row. The UV irradiation battery is enclosed by an essentially tube shaped housing, the inner contour of the housing essentially corresponding to the outer contour of the UV radiator battery.

SUMMARY OF THE INVENTION

A primary object of the present invention is to provide a water treatment apparatus that will overcome the shortcomings of the prior art devices.

Another object is to provide a water treatment apparatus that contains upper and lower compression fittings on the inlet and outlet water pipes, for a quick in line installation thereof.

An additional object is to provide a water treatment apparatus that utilizes a brace to electrically ground the inlet and outlet water pipes, while the brace also reinforces the apparatus in the in line installation.

A further object is to provide a water treatment apparatus that is simple and easy to use.

A still further object is to provide a water treatment apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a top perspective view of the present invention mounted to a wall, with the inlet water pipe and the outlet water pipe broken away.

FIG. 2 is a top view taken in the direction of arrow 2 in FIG. 1, with parts removed, shown in phantom and in section.

FIG. 3 is a front view of the present invention per se, taken in the direction of arrow 3 in FIG. 1, with parts broken away, showing a plunger of a disinfectant container fluidly connected to a drain faucet thereof.

FIG. 4 is a front view of the present invention per se, taken in the direction of arrow 4 in FIG. 1, with parts broken away and in section, showing the interior components of the inner and outer sleeves.

Figure 6:
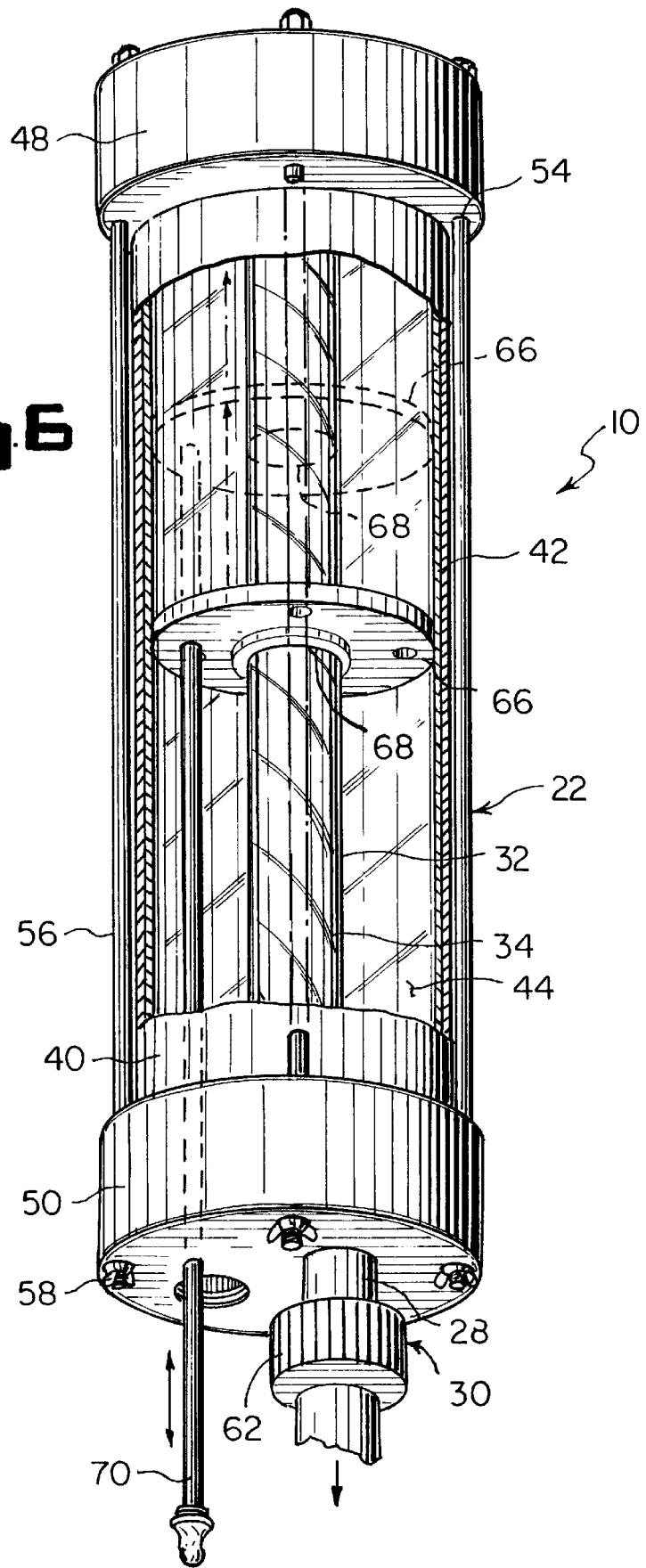

FIG. 5 is an enlarged front view of an upper portion of the present invention per se, taken in the direction of arrow 5 in FIG. 1, with parts broken away and in phantom; and FIG. 6 is a bottom perspective view of the present invention per se, taken in the direction of arrow 6 in FIG. 1, with parts broken away and in section, showing the wiper in greater detail and in a dotted moved position within the inner sleeve.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 6 illustrate the present invention being a water treatment apparatus 10. With regard to the reference numerals used, the following numbering is used throughout the various drawing figures.

10 water treatment apparatus
12 elongate metallic brace of 10
14 wall
16 connecting components of 10
18 inlet water pipe
20 outlet water pipe
22 housing assembly of 10
24 lamp entrance of 22
26 water inlet port of 22
28 water outlet port of 22
30 fluidly attaching and detaching facility of 10
32 elongate transparent quartz tube of 10
34 elongate ultraviolet lamp of 10
36 pipe clamp of 16
38 wing nut fastener of 16
40 cylindrical outer sleeve of 22
42 cylindrical inner sleeve of 22
44 internal mirrored surface on 42
46 O-ring gasket seal of 22
48 upper cylindrical head piece of 22
50 lower cylindrical head piece of 22
52 seat in 48 and 50
54 hole through 48 and 50
56 tire rod of 22
58 wing nut of 22
60 first compression fitting of 30
62 second compression fitting of 30
64 screened water diffuser in 22
66 disc shaped wiper plate in 22
68 central aperture in 66
70 elongate wiper arm in 22
72 drain faucet on 50
74 disinfection liquid introducing assembly
76 pump cap of 74
78 container
80 flexible tube of 74
82 influent shut off gate valve between 18 and 26
84 effluent shut off gate valve between 20 and 28
86 view port connector on 24
88 window in 86

The water treatment apparatus 10 comprises an elongate metallic brace 12 mounted to a wall 14. Components 16 are for connecting the elongate metallic brace 12 to an inlet water pipe 18 and an outlet water pipe 20, so as to electrically ground the inlet water pipe 18 to the outlet water pipe 20. The elongated metallic brace 12 will also reinforce and stabilize the apparatus 10 in an in line installation to the inlet water pipe 18 and the outlet water pipe 20. A housing assembly 22 has a lamp entrance 24, a water inlet port 26 and a water outlet port 28. The housing assembly 22 is prefabricated, so that it can be completely dismantled for cleaning and easily reassembled for use. A facility 30 is for fluidly attaching and detaching the inlet water pipe 18 to the water inlet port 26 and the outlet water pipe 20 to the water outlet port 28 of the housing assembly 22, for a quick in line installation. An elongate transparent quartz tube 32 connected to the lamp entrance 24 and centrally disposed in a leakproof manner within the housing assembly 22 is capable of passing ultraviolet rays therethrough. An elongate ultraviolet lamp 34 is inserted through the lamp entrance 24 of the housing assembly 22 and into the elongate transparent quartz tube 32, so that water passing through the housing assembly 22 will have bacteria removed therefrom.

The connecting component 16 consists of a pair of pipe clamps 36. A plurality of wing nut fasteners 38 hold the pip clamps 36 to the elongate metallic brace 12.

The housing assembly 22 includes a cylindrical outer sleeve 40. A cylindrical inner sleeve 42 has an internal mirrored surface 44 to reflect the ultraviolet rays. The cylindrical inner sleeve 42 is insertable into the cylindrical outer sleeve 40. A pair of O-ring gasket seals 46 are each placed on opposite ends of the cylindrical outer sleeve 40 and the cylindrical inner sleeve 42. Two cylindrical head pieces 48, 50 are provided. Each cylindrical head piece 48, 50 has a seat 52 therein and a plurality of holes 54 radially positioned therethrough, so that the seats 52 will receive the O-ring gasket seals 46. A plurality of tie rods 56 extend through the holes 54 in the head pieces 48, 50 about an exterior surface of the cylindrical outer sleeve 40. A plurality of wing nuts 58 are threaded onto ends of the tie rods 56, to maintain the O-ring gasket seals 46 in a watertight condition.

The fluidly attaching and detaching facility 30 consists of a pair of compression fittings 60, 62. The first compression fitting 60 is between the inlet water pipe 18 and the water inlet port 24, while the second compression fitting 62 is between the outlet water pipe 20 and the water outlet port 28 of the housing assembly 22.

A screened water diffuser 64 is located between the seat 52 of the upper cylindrical head piece 48 at the water inlet port 26, so as to evenly swirl the water past the elongate transparent quartz tube 32. A disc shaped wiper plate 66 has a central aperture 68. The wiper plate 66 can clean the internal mirrored surface 44 of the cylindrical inner sleeve 42 and an outer surface of the elongate transparent quartz tube 32 simultaneously. An elongate wiper arm 70 is attached to the wiper plate 66 and extends through the cylindrical head piece 50. The elongate wiper arm 70 can be manually operated to move the wiper plate 66 therein. A drain faucet 72 is fluidly mounted onto the lower cylindrical head piece 50, to purge the housing assembly 22 for service.

An assembly 74, as shown in FIG. 3, is connected to the drain faucet 72, for introducing a disinfection liquid into the housing assembly 22 after being serviced. The disinfection liquid introducing assembly 74 includes a pump cap 76 connected to a container 78 holding the disinfection liquid. A flexible tube 80 extends between the pump cap 76 and the drain faucet 72.

An influent shut off gate valve 82 is built in between the inlet water pipe 18 and the water inlet port 26 of the housing assembly 22. An effluent shut off gate valve 84 is built in between the outlet water pipe 20 and the water outlet port 28 of the housing assembly 22 for easy and quick service.

A view port connector 86 is removably attached to the lamp entrance 24 of the housing assembly 22. The view port connector 86 has a window 88 therein, so that a person can visually see if the elongate ultraviolet lamp 34 is turned on and working.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A water treatment apparatus comprising:
   a) an elongate metallic brace mounted to a wall;
   b) means for connecting said elongate metallic brace to an inlet water pipe and an outlet water pipe, so as to electrically ground the inlet water pipe to the outlet water pipe, while said elongate metallic brace will also reinforce and stabilize said apparatus in an in line installation to the inlet water pipe and the outlet water pipe;
   c) a housing assembly having a lamp entrance, a water inlet port and a water outlet port, said housing assembly comprising a cylindrical outer sleeve, a cylindrical inner sleeve insertable in said outer sleeve having an internal mirrored surface to reflect ultraviolet rays, a pair of O-ring gasket seals each placed on opposite ends of said cylindrical sleeves, two cylindrical head pieces each having an annular seat to receive one of said O-ring gasket seals and a plurality of holes radially positioned therethrough around said outer sleeve, a plurality of tie rods extending through said holes in said head pieces about an exterior surface of said cylindrical outer sleeve, and a plurality of wing nuts threaded onto ends of said tie rods to maintain said O-ring gasket seals in a watertight condition, said housing assembly being prefabricated to permit cleaning and easy reassembly for use;
   d) means for fluidly attaching and detaching the inlet water pipe to said water inlet port and the outlet water pipe to said water outlet port of said housing assembly for a quick in line installation;
   e) an elongate transparent quartz tube connected to said lamp entrance and centrally disposed in a leakproof manner within said housing assembly, being capable of passing ultraviolet rays therethrough;
   f) an elongate ultraviolet lamp inserted through said lamp entrance of said housing assembly and into said elongate transparent quartz tube, so that water passing through said housing assembly around said quartz tube and along the inside of said inner cylindrical sleeve will have bacteria destroyed in said water;
   g) a screened water diffuser located within said annular seat of said cylindrical head piece at said water inlet port in said housing assembly to evenly swirl the water past said elongate transparent quartz tube;
   h) a disc shaped wiper plate having a central aperture fitted between said quartz tube and the inner, mirrored surface of said cylindrical inner sleeve and an elongate wiper arm attached to said wiper plate extending through one of said cylindrical head pieces with a knob at the end of said wiper arm extending out of said housing assembly to permit said arm and disc to be moved manually back and forth to simultaneously clean the outer surface of said quartz tube and the inner surface of said cylindrical inner sleeve;
   i) means comprising a drain faucet fluidly mounted onto said lower cylindrical head piece to purge said housing assembly for service and for introducing a disinfection liquid into said housing assembly after said housing assembly is purged, said drain faucet including a pump cap connected to a container holding the disinfection liquid and a flexible tube extending between said pump cap and said drain faucet;

j) an L-shaped view port connector removably attached at one end to said lamp entrance on an end cap of said housing assembly in line with said lamp and having a window at the other end of said connector for permitting a person to visually see from a side of said assembly if said ultraviolet lamp is turned on and working.

2. A water treatment apparatus as recited in claim 1, wherein said connecting means includes:

a) a pair of pipe clamps; and b) a plurality of wing nut fasteners for holding said pipe clamps to said elongate metallic brace.

3. A water treatment apparatus as recited in claim 1, wherein said fluidly attaching and detaching means includes a pair of compression fittings, whereby said first compression fitting is between said inlet water pipe and said water inlet port, while said second compression fitting is between said outlet water pipe and said water outlet port of said housing assembly.

4. A water treatment apparatus as recited in 1, further including:

a) an influent shut off gate valve built in between the inlet water pipe and said water inlet port of said housing assembly; and b) an effluent shut off gate valve built in between the outlet water pipe and said water outlet port of said housing assembly for easy and quick service.

* * * * *